United States Patent [19]

Sanui

[11] Patent Number: 6,049,592

[45] Date of Patent: Apr. 11, 2000

[54] SYSTEM FOR AND METHOD OF MUTUALLY MONITORING INFORMATION GUIDANCE UNITS INTERCONNECTED TO TELEPHONE LINES

[75] Inventor: Yoshihiro Sanui, Tokyo, Japan

[73] Assignee: Oki Electric Industry Co., Ltd., Tokyo, Japan

[21] Appl. No.: 08/912,653

[22] Filed: Aug. 18, 1997

[30] Foreign Application Priority Data

Aug. 23, 1996 [JP] Japan ..................................... 8-222029

[51] Int. Cl.⁷ ............................ H04M 1/24; H04M 3/08; H04M 3/22
[52] U.S. Cl. .................................... 379/27; 379/1; 379/29
[58] Field of Search ........................ 379/1, 9, 14, 15–17, 379/27, 29, 32, 33–34, 37, 112–113, 133–134, 100.05–100.06, 102.02, 102.06, 106.08

[56] References Cited

U.S. PATENT DOCUMENTS

| | | | |
|---|---|---|---|
| 4,059,736 | 11/1977 | Perucca et al. ........................ | 364/238 |
| 4,412,292 | 10/1983 | Sedam et al. ....................... | 364/479.11 |
| 4,581,606 | 4/1986 | Mallory .................................... | 340/539 |
| 4,766,548 | 8/1988 | Cedrone et al. .................... | 364/479.06 |
| 4,955,052 | 9/1990 | Hussain .................................. | 379/148 |
| 5,579,368 | 11/1996 | Van Berkum ............................. | 379/9 |
| 5,592,530 | 1/1997 | Brockman et al. ...................... | 379/34 |

FOREIGN PATENT DOCUMENTS 6-311287   4/1994   Japan .

*Primary Examiner*—Curtis A. Kuntz
*Assistant Examiner*—Duc Nguyen
*Attorney, Agent, or Firm*—Wenderoth, Lind & Ponack, L.L.P.

[57] ABSTRACT

A fault monitoring system having a reduced cost and management load. The system includes a voice/facsimile response unit composed of a controller and a network interface. The controller has a management server and a fault monitoring section to achieve the voice/facsimile response function. It dials through the network interface a monitored line which is entered on a monitored subject information table at a calling time intervals. If the dialing call is established to the called party, then the monitored line is regarded as normal. If the called party is busy, the dialing is iterated. If the frequency of the redialings exceeds a predetermined number, this is regarded as a fault occurring at the called party. When notifying a maintenance person of the fault by voice, a voice message is edited for the notification. When notifying the maintenance person of the fault by telefax, text data is edited. The mutual fault monitoring between the voice/facsimile response units makes it possible to obviate a dedicated computer and telecommunications channels for monitoring.

13 Claims, 20 Drawing Sheets

| MONITORED LINE PHONE NUMBER | IDENTIFIER OF CALLED PARTY | MONITOR CALL INTERVAL (sec) | RETRIAL INTERVAL IN BUSY CONDITION (sec) |
|---|---|---|---|
| 03-5546-1234 | sys-1-1 | 600 | 180 |
| 03-5546-1235 | sys-1-2 | 600 | 180 |
| 03-5546-1236 | sys-1-3 | 600 | 180 |
| 03-5546-2221 | sys-2-1 | 600 | 180 |
| 03-5546-2222 | sys-2-2 | 600 | 180 |
| 03-5546-2223 | sys-2-3 | 600 | 180 |
| 03-5546-2224 | sys-2-4 | 600 | 180 |

| REITERATION TIMES IN BUSY CONDITION | PHONE NUMBER OF MAINTENANCE PERSON | CONTACT HOURS | NOTIFICATION METHOD |
|---|---|---|---|
| 10 | 03-5546-9876 | 8-17 | VOICE |
| 10 | 03-5546-9876 | 8-17 | VOICE |
| 10 | 03-5546-9876 | 8-17 | VOICE |
| 10 | 03-4545-1111 | 8-20 | FAX |
| 10 | 03-4545-1112 | 8-20 | FAX |
| 10 | 03-4545-1113 | 8-20 | FAX |
| 10 | 03-4545-1114 | 8-20 | FAX |

*FIG.5B*

| MONITORED LINE PHONE NUMBER | IDENTIFIER OF CALLED PARTY | FAULT STATE | DATE AND TIME OF FAULT |
|---|---|---|---|
| 03-5546-1234 | sys-1-1 | NO RESPONSE | 12:03 ON JUN. 12 |
| 03-5546-1236 | sys-1-3 | NO RESPONSE | 01:50 ON JUN. 15 |
| 03-5546-2221 | sys-2-1 | BUSY | 12:11 ON JUN. 17 |
| 03-5546-2222 | sys-2-2 | NO RESPONSE | 19:03 ON JUN. 12 |
| 03-5546-2224 | sys-2-4 | NO RESPONSE | 19:13 ON JUN. 12 |

| PHONE NUMBER OF MAINTENANCE PERSON | NOTIFICATION METHOD |
|---|---|
| 03-5546-9876 | VOICE |
| 03-5546-9876 | VOICE |
| 03-4545-1111 | FAX |
| 03-4545-1112 | FAX |
| 03-4545-1114 | FAX |

EDITED VOICE/FAX DATA

| |
|---|
| "FAULT 'NO RESPONSE' OCCURS IN RESPONSE SYSTEM SYS-1-1 AT 12:03 ON JUN. 12" |
| "FAULT 'NO RESPONSE' OCCURS IN RESPONSE SYSTEM SYS-1-3 AT 01:50 ON JUN.15" |
| "FAULT 'BUSY' OCCURS IN RESPONSE SYSTEM SYS-2-1 AT 12:11 ON JUN.17" |
| "FAULT 'NO RESPONSE' OCCURS IN RESPONSE SYSTEM SYS-2-2 AT 19:03 ON JUN.12" |
| "FAULT 'NO RESPONSE' OCCURS IN RESPONSE SYSTEM SYS-2-4 AT 19:13 ON JUN.12" |

*FIG.8B*

| SYSTEM IDENTIFIER | PHONE NUMBER OF MAINTENANCE PERSON | CONTACT HOURS | NOTIFICATION METHOD |
|---|---|---|---|
| sys-1-1 | 03-5546-9876 | 8-17 | VOICE |

*FIG.12*

| SYSTEM IDENTIFIER | DIAGNOSTIC PROGRAM | FAULT STATE | DATE AND TIME OF FAULT |
|---|---|---|---|
| SYS-1 | PROG 1 | ABEND | 12:13, JUNE 12 |
| SYS-1 | PROG 2 | I/O ERROR | 01:50, JUNE 15 |
| SYS-1 | PROG 5 | I/O ERROR | 12:11, JUNE 17 |
| SYS-1 | PROG 1 | TIME OUT | 19:03, JUNE 12 |
| SYS-1 | PROG 6 | I/O ERROR | 19:13, JUNE 12 |

| PHONE NUMBER OF MAINTENANCE PERSON | NOTIFICATION METHOD |
|---|---|
| 03-5546-9876 | VOICE |
| 03-5546-9876 | VOICE |
| 03-5546-9876 | VOICE |
| 03-5546-9876 | VOICE |
| 03-5546-9876 | VOICE |

| EDITED VOICE/FAX DATA |
|---|
| "FAULT 'ABEND' OCCURS IN RESPONSE SYSTEM PROG 1 OF SYS-1 AT 12:03 ON JUN. 12" |
| "FAULT 'I/O ERROR' OCCURS IN RESPONSE SYSTEM PROG 2 OF SYS-1 AT 01:50 ON JUN.15" |
| "FAULT 'I/O ERROR' OCCURS IN RESPONSE SYSTEM PROG 5 OF SYS-1 AT 12:11 ON JUN.17" |
| "FAULT 'TIME-OUT' OCCURS IN RESPONSE SYSTEM PROG 1 OF SYS-1 AT 19:03 ON JUN.12" |
| "FAULT 'I/O ERROR' OCCURS IN RESPONSE SYSTEM PROG 6 OF SYS-1 AT 19:13 ON JUN.12" |

SYSTEM FOR AND METHOD OF MUTUALLY MONITORING INFORMATION GUIDANCE UNITS INTERCONNECTED TO TELEPHONE LINES

BACKGROUND OF THE INVENTION

1. Field of the Invention

The present invention relates to a fault monitoring system for monitoring information guidance units interconnected by telephone lines.

2. Description of the Background Art

As conventional information guide systems, voice/facsimile response units have been known to provide guidance information in response to inquiries from users over telephones lines to telephone or facsimile subscriber's sets. The conventional voice/facsimile response units are connected to a fault monitoring system that includes a dedicated computer for monitoring their faults. The fault monitoring system periodically communicates with the voice/facsimile response units to be monitored through telecommunications channels. For example, Japanese patent laid-open publication No. 311287/1994 discloses a centralized monitoring system in which facsimile machines have a data storage for storing therein fault data representing details of a fault, when involved, in the machine and a monitoring center is adapted for calling the facsimile machines, via telecommunications lines, to fetch the fault data from the data storage of the facsimile machines.

The conventional fault monitoring system, however, must possess the dedicated monitor computer and the telecommunications channels for interconnecting the dedicated monitor computer to the voice/facsimile response units. In addition, such a conventional system requires a supervisor for monitoring faults of the voice/facsimile response units by regularly operating the dedicated monitor computer.

As a result, the conventional fault monitoring system must bear heavy loads both in the expense for constructing the facility and in managing the system.

SUMMARY OF THE INVENTION

It is therefore an object of the present invention to provide a fault monitoring system and method capable of lightening the loads in the expense and management for monitoring information guidance units.

According to an aspect of the present invention, there is provided a fault monitoring system for monitoring a plurality of information guide units interconnected to telephone lines, each of the information guide units comprising: a monitoring circuit for monitoring at least one other of the information guide units interconnected to detect a fault in the at least one other information guide unit; and a notifying circuit operative in response to the monitoring circuit for notifying a receiver unit of information on the fault over the telephone lines when the fault is detected by the monitoring circuit.

Here, the information guide units may be adapted to mutually monitor the fault. The monitoring circuit may be adapted to carry out the monitoring by dialing the at least one other information guide unit.

According to another aspect of the present invention, there is provided a fault monitoring system for monitoring a plurality of information guide units interconnected to telephone lines, each of the information guide units comprising: a monitoring circuit for monitoring the information guide unit per se to detect a fault in the information guide unit per se; and a notifying circuit operative in response to the monitoring circuit for notifying a receiver unit of information on the fault over a telephone line when the fault is detected by the monitoring circuit.

Here, the notifying circuit may be adapted to notify over a telephone channel over which a user inquires guidance information of the information guide units. The notifying circuit may be adapted to notify by either voice or facsimile. The notifying circuit may also be adapted to notify by a method matching the receiver unit.

According to a further aspect of the present invention, there is provided a fault monitoring method of monitoring a plurality of information guide units interconnected to telephone channels, the method comprising the steps of: monitoring at least one other of the plurality of information guide units to detect a fault in the at least one other information guide unit; and notifying a receiver unit of information on the fault over the telephone lines if the fault is detected in the monitoring step.

BRIEF DESCRIPTION OF THE DRAWINGS

The objects and features of the present invention will become more apparent from consideration of the following detailed description taken in conjunction with the accompanying drawings in which:

FIG. 5 shows how FIGS. 5A and 5B are combined;

FIGS. 5A and 5B show, when combined as shown in FIG. 5, a table useful for understanding data structures of a monitored subject information table of the embodiment;

FIGS. 6A and 6B show, when combined as shown in FIG. 6, a table useful for understanding data structures of a fault state recorder of the embodiment;

FIG. 8 shows how FIGS. 8A and 8B are combined;

FIGS. 8A and 8B show, when combined as shown in FIG. 8, a table useful for understanding data structures of a notification information spooler of the embodiment;

FIG. 12 shows a table useful for understanding a data structure of a notification destination information table of the alternative embodiment;

FIGS. 13A and 13B show, when combined as shown in FIG. 13, a table useful for understanding data structures of a fault state recorder of the alternative embodiment;

FIGS. 14A and 14B show, when combined as shown in FIGS. 14, a table useful for understanding data structures of a notification information spooler of the alternative embodiment.

DESCRIPTION OF THE PREFERRED EMBODIMENTS

Figure 1:
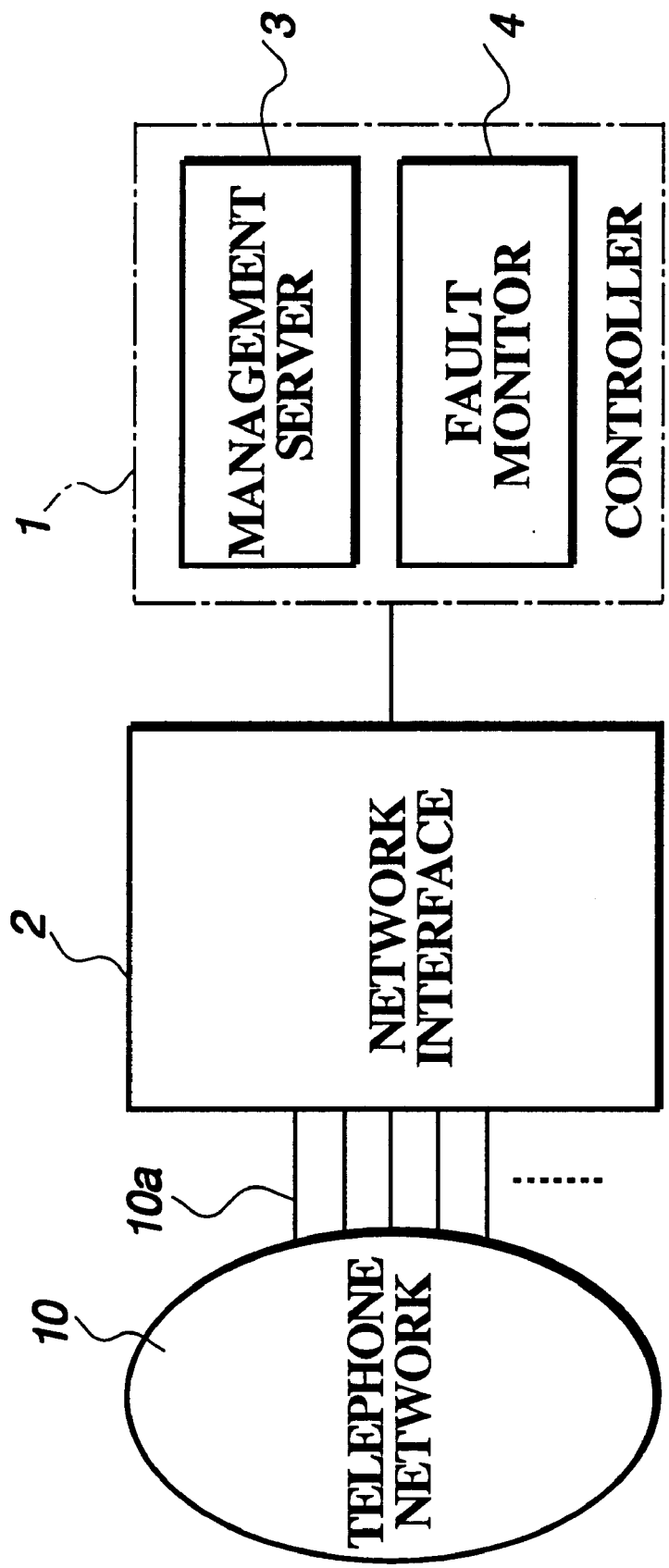
FIG. 1 is a schematic block diagram showing a general configuration of a voice/facsimile response unit in an embodiment of a fault monitoring system in accordance with the present invention.

The invention will now be described with reference to the accompanying drawings. The embodiments of the fault monitoring system in accordance with the invention are applicable to voice/facsimile response units. With reference to FIG. 1, a preferred embodiment of a voice/facsimile response unit in accordance with the invention generally comprises a controller 1 and a network interface 2. The controller 1 generally implements a voice/facsimile response function in which, in response to inquiry calls terminating on the response unit over the telephone network 10, appropriate guidance information is produced and transmitted over the telephone network 10 to the appropriate telephone or facsimile subscriber sets which have forwarded the inquiries.

As shown in FIG. 1, the controller 1 includes a management server 3 for carrying out a normal management service and a fault monitoring section 4. The normal monitoring service includes responding to inquiry calls from users, as well as producing and transmitting guidance information appropriate for inquiry calls in the form of telephone or facsimile signals. The fault monitoring section 4 is adapted to monitor other voice/facsimile response units interconnected to the telephone network 10. The details of the fault monitoring section 4 will be described later.

The network interface 2 is interconnected to a switched telephone network 10 by at least one telephone subscriber line 10a to place or accept calls over lines 10a, to receive push button (PB) signals, and to send or receive facsimile data to or from the telephone network 10.

Figure 2:
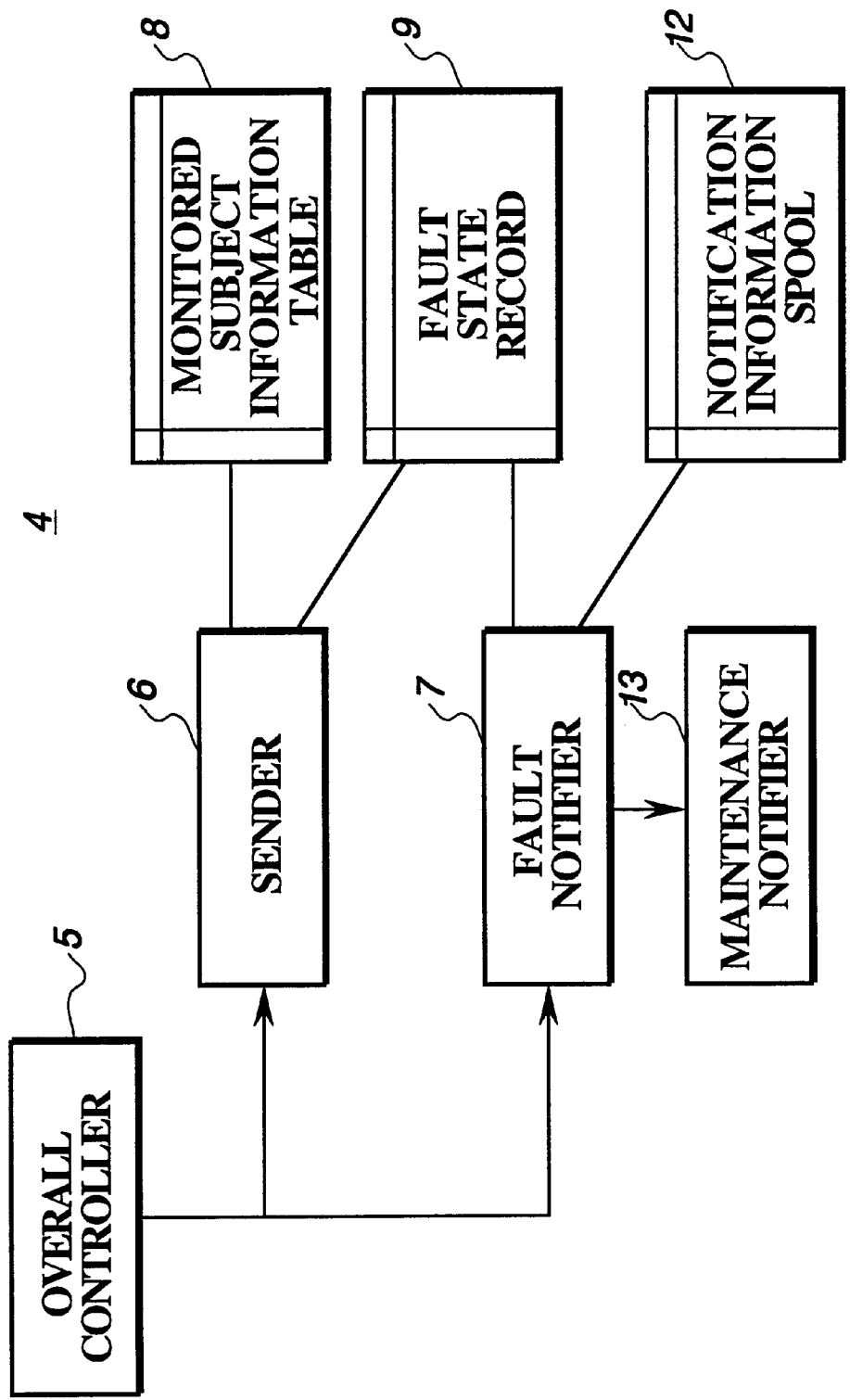
FIG. 2 is a schematic block diagram showing the embodiment of the fault monitoring system in accordance with the present invention.

Referring to FIG. 2, the fault monitoring section 4 comprises an overall controller 5, a sender 6 for originating a call, a fault notifier 7, a monitored subject information table memory 8, a fault state recorder 9 for recording a fault state, a maintenance notifying subsection 13, and a notification information spooler 12.

More specifically, the overall controller 5 controls the sender 6 and fault notifier 7 in accordance with the monitored subject information stored in the monitored subject information table memory 8. If the sender 6 detects a fault, the overall controller 5 transfers the control to the fault notifier 7 to have it notify a maintenance person.

The sender 6 is adapted to automatically dial the phone number of a called voice/facsimile response unit listed on the monitored subject information table 8. If the called voice/facsimile response unit is busy, the sender 6 waits for a retrial interval prescribed by the monitored subject information table 8, and tries to redial. If the called party is still busy after iterating redialings by the number of times designated by the monitored subject information table 8, then the sender 6 regards this as a fault, and records it in the fault state record 9. Moreover, if the called voice/facsimile response unit does not respond to the dialing, the sender 6 also regards the situation as a fault, thus recording it in the fault state record 9.

The fault notifier 7 is activated by the overall controller 5, and edits a message to be sent to a maintenance person referring to the fault state record 9. When notifying the maintenance person by telephone, the fault notifier 7 synthesizes speech of a fixed message with speech data expressing the unit name and the fault state of the called voice/facsimile response unit, and records them on the notification information spool 12. On the other hand, when notifying the maintance person by telefax, the fault notifier 7 merges text information of the fixed message with the text expressing the unit name and the fault state of the called voice/facsimile response unit, and records them on the notification information spool 12.

The notification information spooler 12 is adapted to record the speech data or the text data, the phone number of the maintenance person, and data representing telephone or telefax.

The maintenance notifying subsection 13 is adapted to notify the maintenance person of the fault by telephone or facsimile in accordance with the information recorded on the notification information spool 12.

Figure 3:
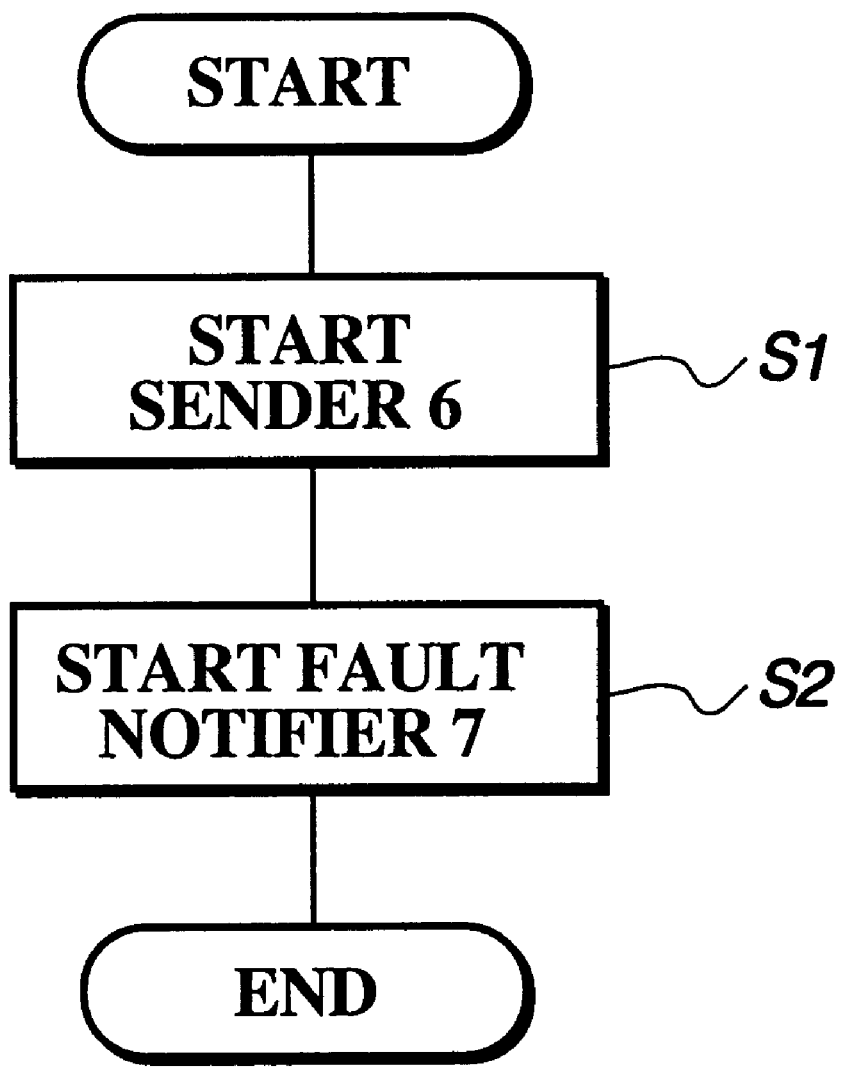
FIG. 3 is a flowchart illustrating a start procedure of an overall controller of the embodiment.

With reference to FIG. 3, in operation, the overall controller 5, activated at the start of the system, enables the sender 6 at step Sl, and then the fault notifier 7 at step S2.

Figure 4:
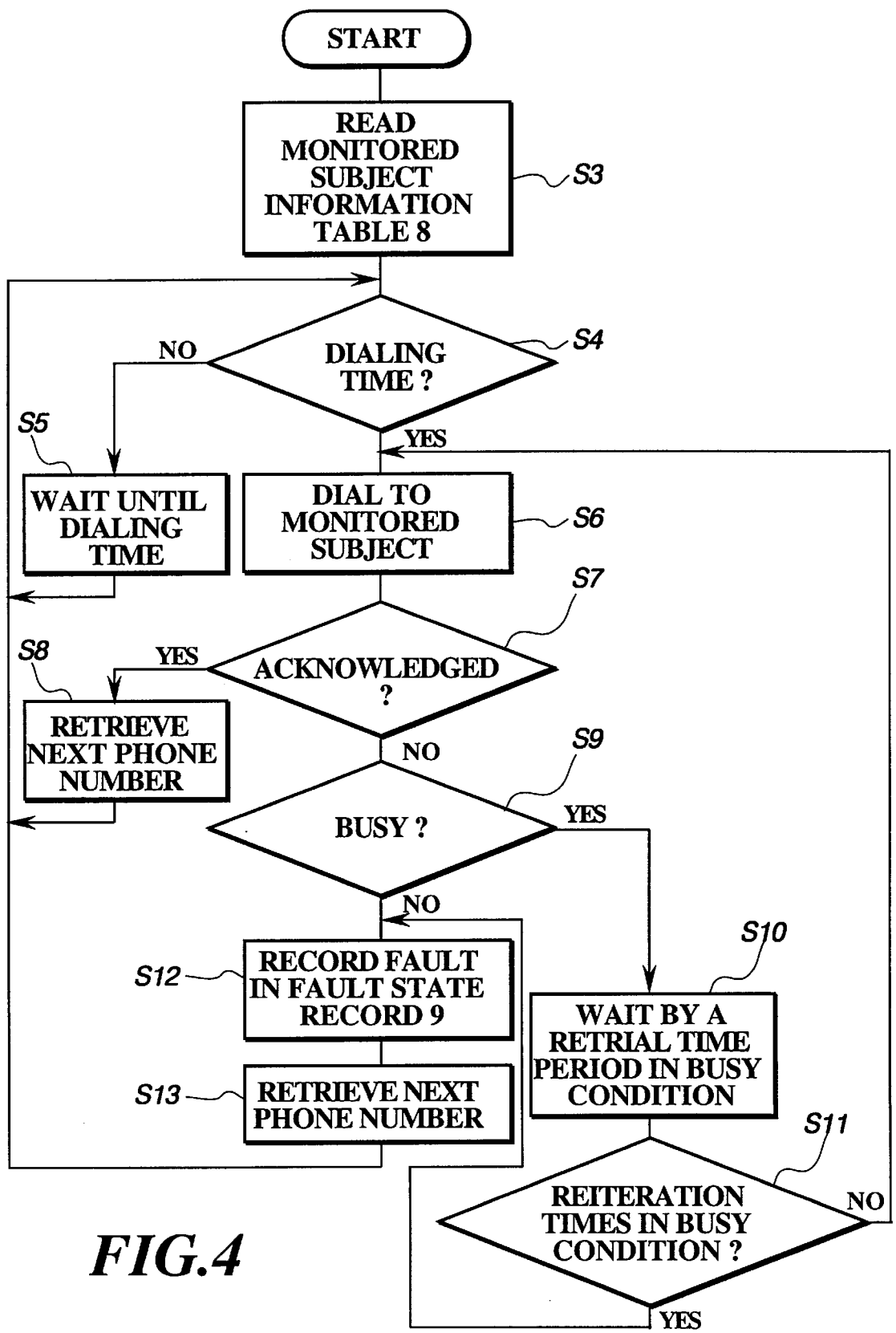
FIG. 4 is a flowchart illustrating an operational procedure of a sender of the embodiment.
Figures 5, 5A:
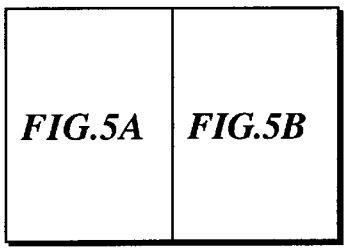

Referring to FIG. 4, in the operational procedure, the sender 6, enabled by the overall controller 5, reads the monitored subject information table 8 at step S3. As shown in FIGS. 5A and 5B, the monitored subject information table 8 records the information used by the sender 6, such as the phone numbers of monitored lines and actions to be taken under the busy conditions, and how to notify the maintenance personnel.

Now, returning to FIG. 4, the sender 6 determines at step S4 when it should call a specific line to be monitored with reference to its monitor calling intervals or schedules recorded in the retrieved monitored subject information table 8, and will, in response, dial an appropriate monitored line through the network interface 2 at step S6. If any appropriate line to be called is not yet involved, then the sender 6 waits until the calling time arrives at step S5.

Upon dialing, the sender 6 receives the result of the dialing from the network interface 2 and decides whether or not the dialing is acknowledged at step S7. When acknowledged, the sender 6 regards the monitored channel to be normal, retrieves the next phone number from the monitored subject information table 8 at step S8, and returns to step S4 to repeat the same operation to the next phone number.

On the other hand, when the acknowledgment is not received at step S7, the sender 6 makes a decision on whether or not the called line was busy at step S9. If the result is neither the acknowledgment nor the busy state, that is, in the case of no response, then the sender 6 regards this state as indicating that a fault occurred in the monitored voice/facsimile response unit.

If it is decided that the called party is busy at step S9, that is, if the monitored line is being used, the sender 6 awaits a retrial interval indicated by the monitored subject information table 8 at step S10. Then, the sender 6 makes a decision at step S11 whether or not it iterates waiting by the prescribed reiteration times in the busy condition. If the decision result indicates that the reiteration times have not yet been satisfied, then control returns to step S6 to redial the monitored channel. In contrast, when the reiteration times have been reached at step S11, the sender 6 regards this as an indication that a fault occurred in the monitored voice/facsimile response unit.

Figures 6, 6A:
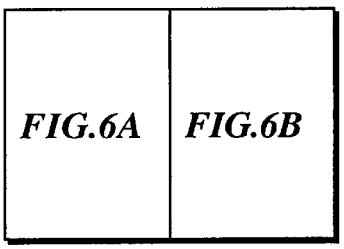
FIG. 6 shows how
FIGS. 6A and 6B are combined.
Figure 6B:

If a fault is detected, then the sender 6 records, on the fault state record 9, the fault state and other information needed for notification at step S12. An exemplified table including the data structure of the fault state record 9 is shown in FIGS. 6A and 6B. Subsequently, the sender 6 retrieves the phone number of the next channel in the monitored subject information table 8 at step S13 and returns to step S4.

Figure 7:
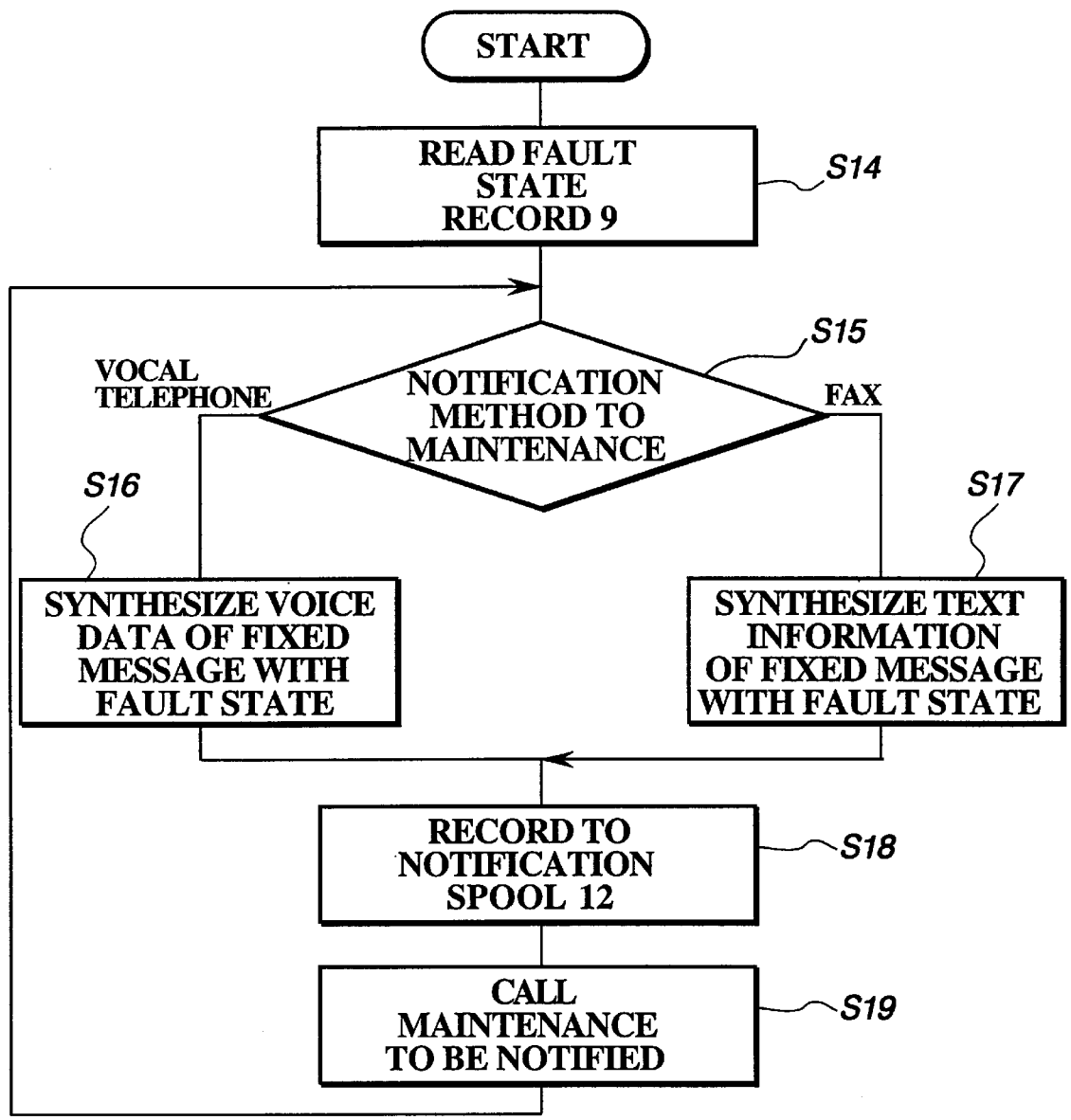
FIG. 7 is a flowchart illustrating an operational procedure of a fault notifier of the embodiment.

With reference to FIG. 7, a flowchart illustrating the procedure of the fault notifier 7, if the sender 6 detects a fault, the fault notifier 7 reads out records from the fault state record 9 at step S14, and makes a decision at step S15 on by which way, either voice or facsimile, a maintenance person is desgnated to be notified by the readout fault state record 9. If it is designated as voice or telephone, the fault notifier 7 edits the speech for notifying the maintenance person by voice (telephone) at step S16. Specifically, it synthesizes the speech including a fixed message, a fault state, the identification name of a party under monitor, and the date and time when the fault occurred. On the other hand, if it is designated by telefax, then the fault notifier 7 edits the text data for notifying the maintenance person by telefax at step S17. Specifically, it synthesizes the text data including the fixed message, a fault state, the identification name of a called party, and the date and time of the fault.

Figures 8, 8A:
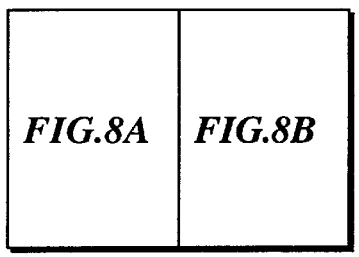

Subsequently, at step S18, the fault notifier 7 records, on the notification information spool 12, the speech or telefax data along with the information needed for notifying the maintenance person, such as the phone number of the maintenance person, which are edited at step S16 or S17. FIGS. 8A and 8B illustrate an exemplified data structure of the notification information spool 12.

Looking up the notification information recorded in the notification information spool 12, the fault notifier 7 dials the phone number of the maintenance personnel through the network interface 2 at step S19. After that, if the notification method is designated as voice, the fault notifier 7 telephonically develops the edited speech. It repeats the speech message three times to prevent erroneous hearing by the maintenance person. If the notification method is designated to telefax, then the fault notifier 7 delivers the edited fax data to the facsimile machine. When completing the output of the speech or telefax message, the fault notifier 7 returns its control to step S14 so that it looks up again to the fault state recorder 9 and notifies a maintenance person of the next fault information.

Figure 9:
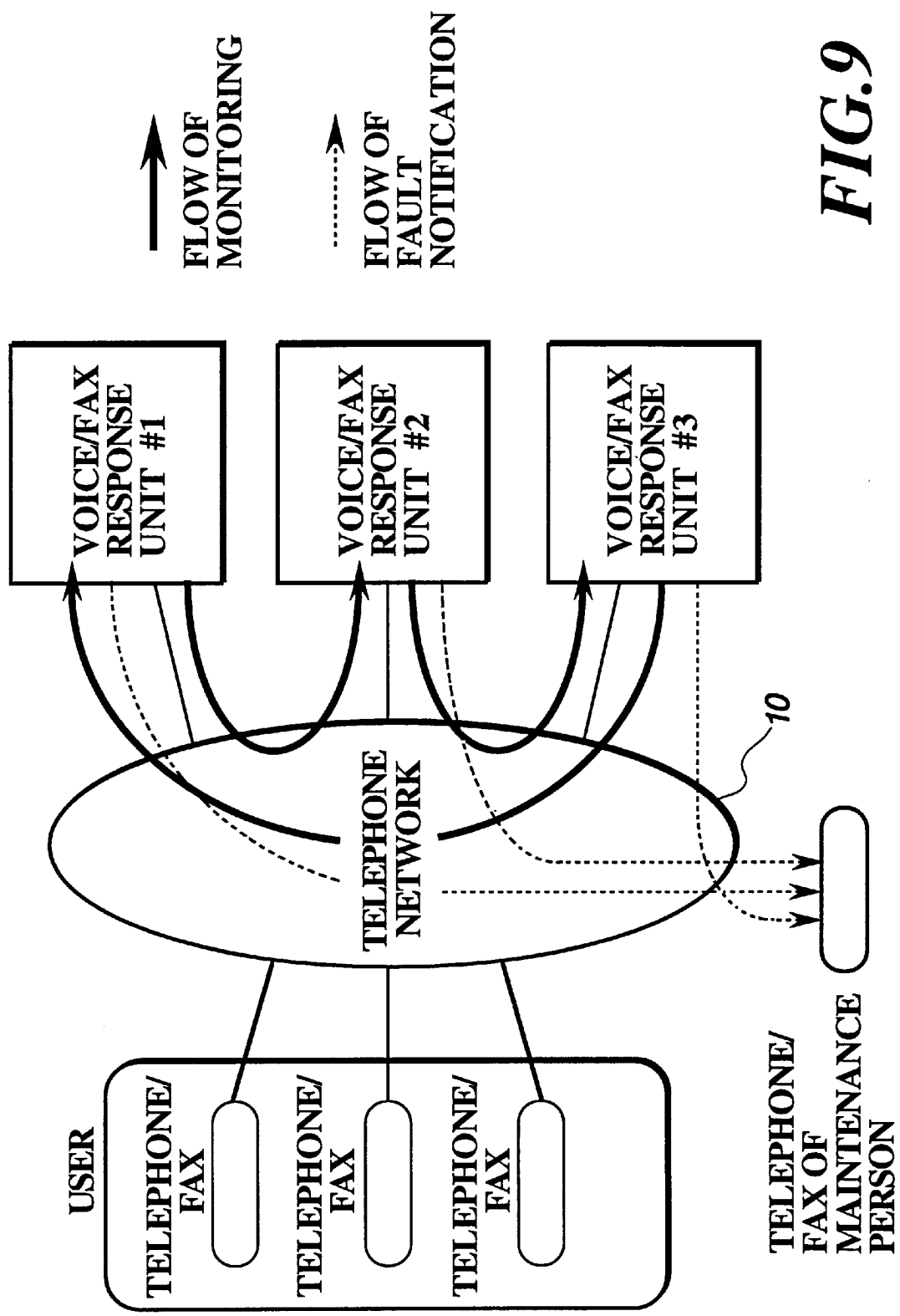
FIG. 9 is a schematic block diagram illustrating an operational configuration of a voice/facsimile response unit in the embodiment.

Referring to FIG. 9 illustrating an application scheme of the voice/facsimile response unit, a plurality of the voice/facsimile response units are interconnected to a telephone network 10 in such a cyclic way that the voice/facsimile response units #1, #2, and #3 are adapted to monitor the voice/facsimile response units #2, #3, and #1, respectively.

Employing such a scheme, in which the plurality of voice/facsimile response units monitors one another, makes it possible to notify a telephone or facsimile subscriber set of maintenance personnel of a detected fault along the flows indicated by the broken lines in FIG. 9. The monitoring processing can be achieved in parallel with the voice/facsimile services to users.

Since the fault monitoring system of the instant embodiment employs the scheme in which the operating voice/facsimile response units monitor one another, the dedicated monitor computer or its telecommunications channel can be obviated.

In addition, since a maintenance person is automatically informed of the detected fault of a monitored voice/facsimile response unit without delay utilizing the dialing function and the speech or telefax message producing function of the voice/facsimile response unit, it is not necessary for the maintenance person to continually monitor the voice/facsimile response units.

Furthermore, since the monitoring is carried out utilizing the telephone channels used for the user services, faults of the channels can be detected besides the faults of the voice/facsimile response units.

In this way, the fault monitoring system for a plurality of voice/facsimile response units can be constructed without installing a dedicated monitor computer or telecommunications channels connected thereto. This can reduce the expense and ease the burden of operation. Besides, since the detected fault is immediately and automatically reported to the maintenance person, an expeditious maintenance of the system can be achieved.

Although the voice/facsimile response units of the present embodiment employ the telephone or facsimle for notifying the maintenance personnel of the fault, other means such as electronic mail or cordless phone can also be applied, thus making it possible to construct various schemes of the monitoring system.

Moreover, although the scheme in which the voice/facsimile response units #1, #2, and #3 monitor one another is employed in the system shown in FIG. 9, another scheme can also be used in which a particular voice/facsimile response unit monitors the entire remaining voice/facsimile response units. This can implement a more economical system.

For the telephone network 10, public switched telephone networks (PSTNs) or integrated services digital networks (ISDNs) may be employed.

Although in the illustrative embodiment described above, the voice/facsimile response units interconnected to the switched telephone network are adapted to monitor one anothers faults, an alternative embodiment will be described in which an operating voice/facsimile response unit is adapted to monitor its own fault.

Figure 10:
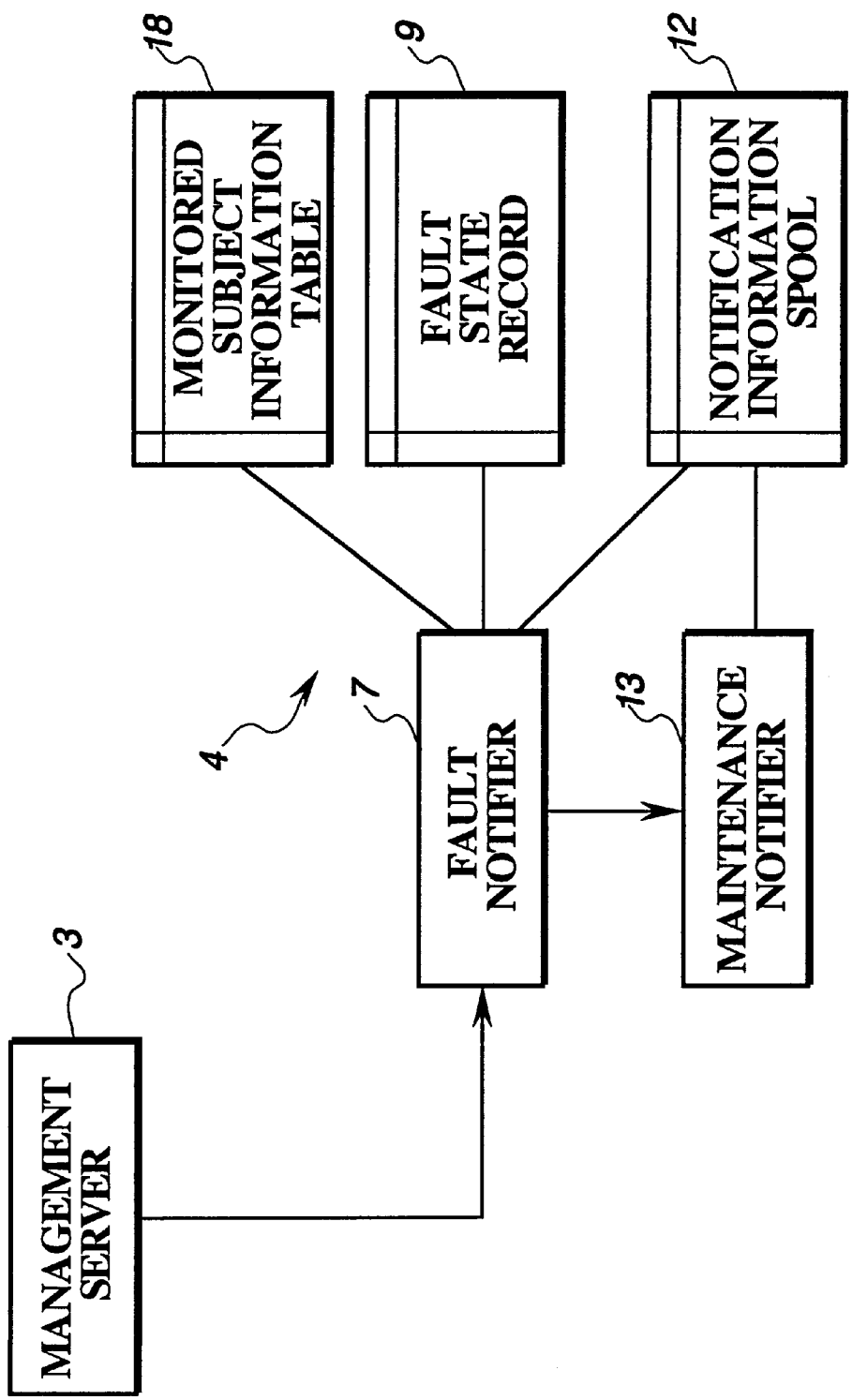
FIG. 10 is a schematic block diagram, similar to FIG. 2, showing an alternative embodiment of the fault monitoring system in accordance with the present invention.

A voice/facsimile response unit in accordance with the alternative embodiment may be the same as the embodiment described earlier except for the arrangement of the fault monitoring section 4. With reference to FIG. 10, the like elements are designated by the same reference numerals as those of the embodiment described earlier, and the redundant description thereof is omitted here.

The fault monitoring section 4 is composed of the fault notifier 7, a notification destination information table 18, the fault state recorder 9, the notification information spool 12, and the maintenance notifying subsection 13, and is activated when some fault is detected by the management server 3.

The fault notifier 7, upon receiving information on a fault in a program sequence from the management server 3, reads out the notification destination information table 18 to obtain notification information to be sent to a maintenance person. The fault notifier 7 records it on the fault state recorder 9 together with the program fault. After that, the fault notifier 7 edits the message to be sent to the maintenance person in the same manner as that of the earlier described embodiment, and records the result on the notification information spool 12. The notification information spool 12 in turn records the speech or telefax text data to be sent to the maintenance person, and the telephone subscriber number of the maintenance person. The maintenance notifying subsection 13 notifies the maintenance person by telephone or facsimile in accordance with the information of the notification information spool 12.

Figure 11:
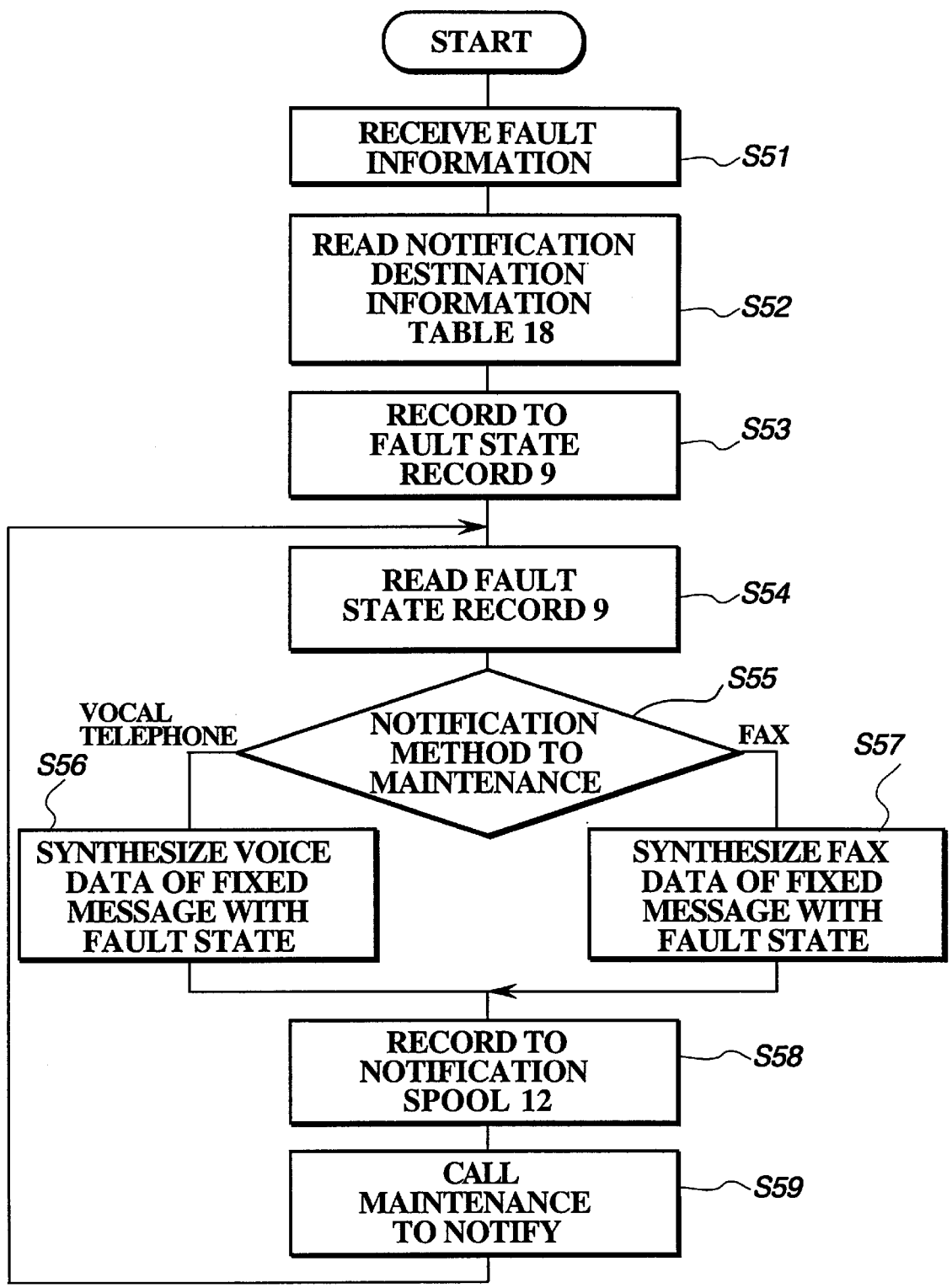
FIG. 11 is a flowchart illustrating an operational procedure of a fault notifier of the alternative embodiment.

In operation, with reference to FIG. 11 illustrating the procedural flow of the fault notifier 7, activated by the management server 3, the fault notifier 7 obtains, from the management server 3 the fault information such as the name of a faulty program sequence, the fault state, and the time and date when the fault occurred at step S51. Then, the fault notifier 7 reads the notification destination information table 18 at step S52 to obtain the system identification name of this system, the phone number of a maintenance person, which of the hours in which a contact is made with the maintenance person, and how to notify. FIG. 12 shows a table illustrating the data structure of the notification destination information table 18.

Figures 13, 13A:
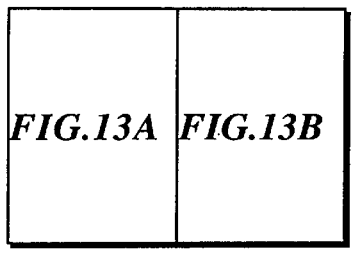
FIG. 13 shows how
FIGS. 13A and 13B are combined.
Figure 13B:
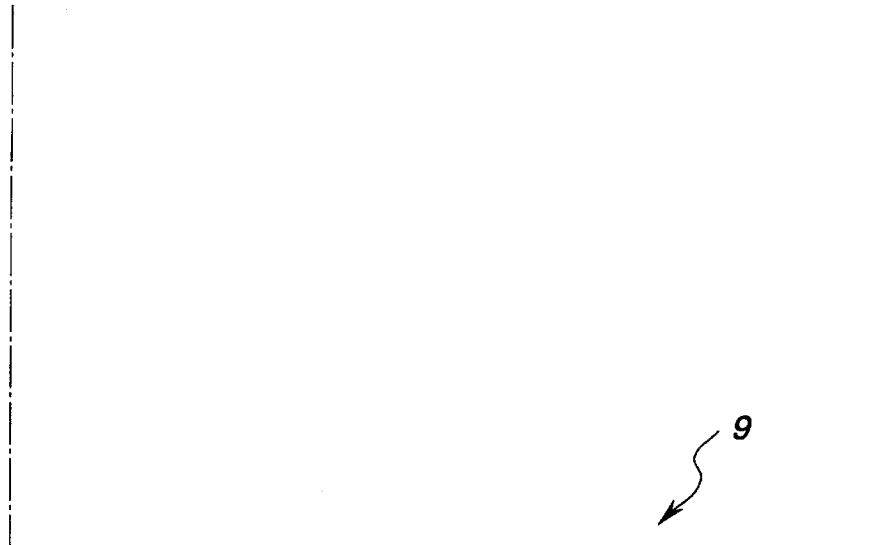

Subsequently, the fault notifier 7 synthesizes the fault information obtained at step S51 and the notification destination information obtained at step S52, and records its result on the fault state recorder 9 at step S53. FIGS. 13A and 13B show a table illustrating the data structure of the fault state record 9.

The fault notifier 7 reads out at step S54 the fault state recorded at step S53, and makes a decision on a way of notifying the maintenance person at step S55. When notifying the maintenance person by telephone, the fault notifier 7 edits notification speech at step S56. Specifically, it synthesizes the speech data of a fixed message with the fault state, the system identification name, the name of a faulty program, and the time and the date when the fault was encountered On the other hand, when notifying the maintenance person by telefax, the fault notifier 7 edits notification text data at step S57. Specifically, it synthesizes the text data of the fixed message with the fault state, the system identification name, the faulty program name, and the time and date of the fault.

Figures 14, 14A:
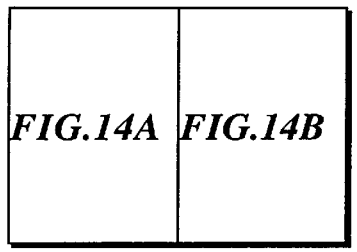
FIG. 14 shows how
FIGS. 14A and 14B are combined.
Figure 14B:
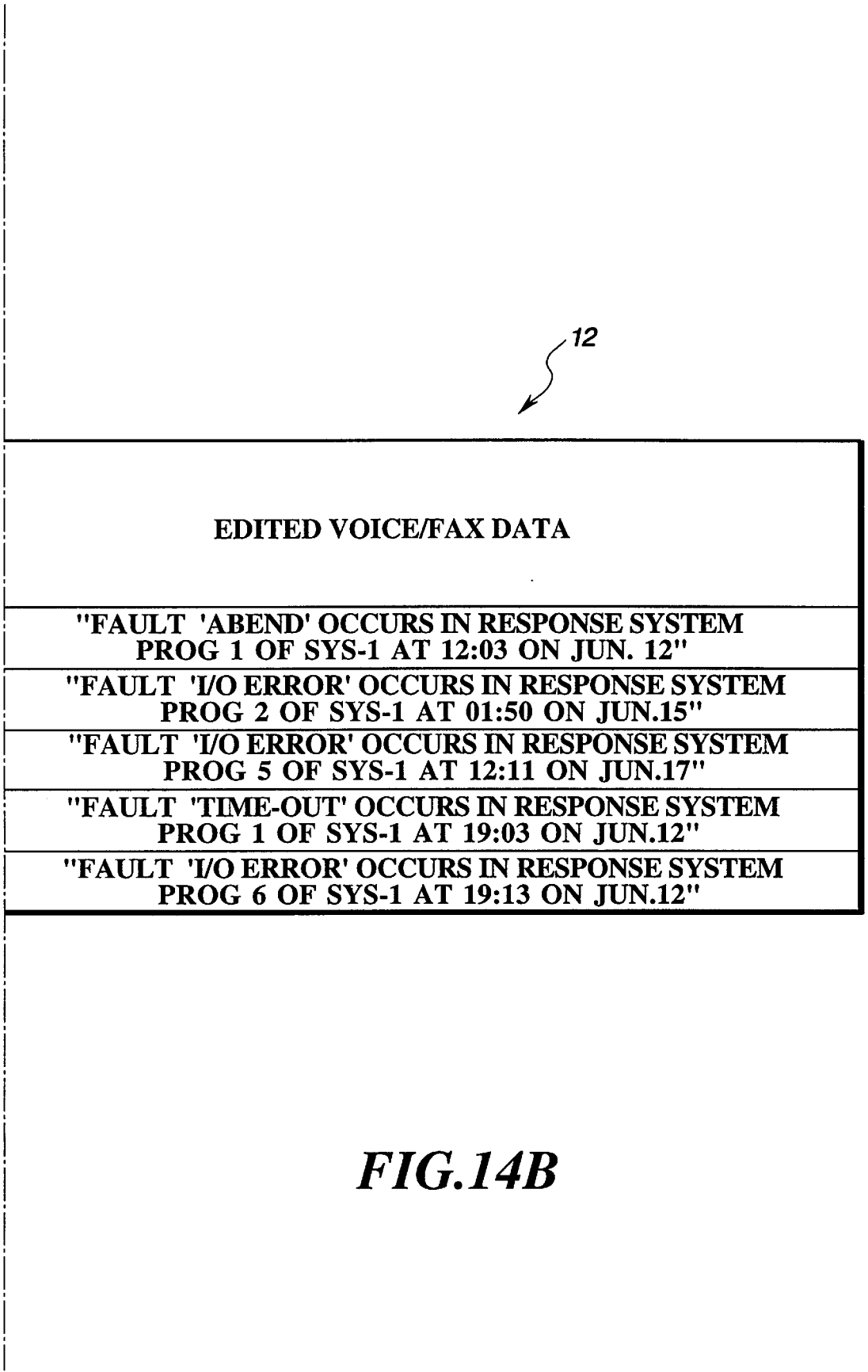

At step S58, the fault notifier 7 records on the notification information spool 12 the information needed for notifying the maintenance person of the information such as the speech or fax data edited at step S56 or S57, and the phone number of the maintenance person. FIGS. 14A and 14B show a table illustrating the data structure of the notification information spool 12.

After that, the fault notifier 7 looks up the notification information recorded in the notification information spool 12, and has the maintenance notifying subsection 13 dial the phone number of the maintenance person at step S59. Then, the fault notifier 7 develops the edited speech data to the telephone circuit if the way of notification is designated as speech The speech message is repeated three times to prevent an erroneous hearing by the maintenance person. In contrast, it delivers the edited telefax data to the facsimile if the way of notification is designated as telefax. After completing the development of the message, the fault notifier 7 returns its control to step S54 to notify a maintenance person of the next fault information.

Figure 15:
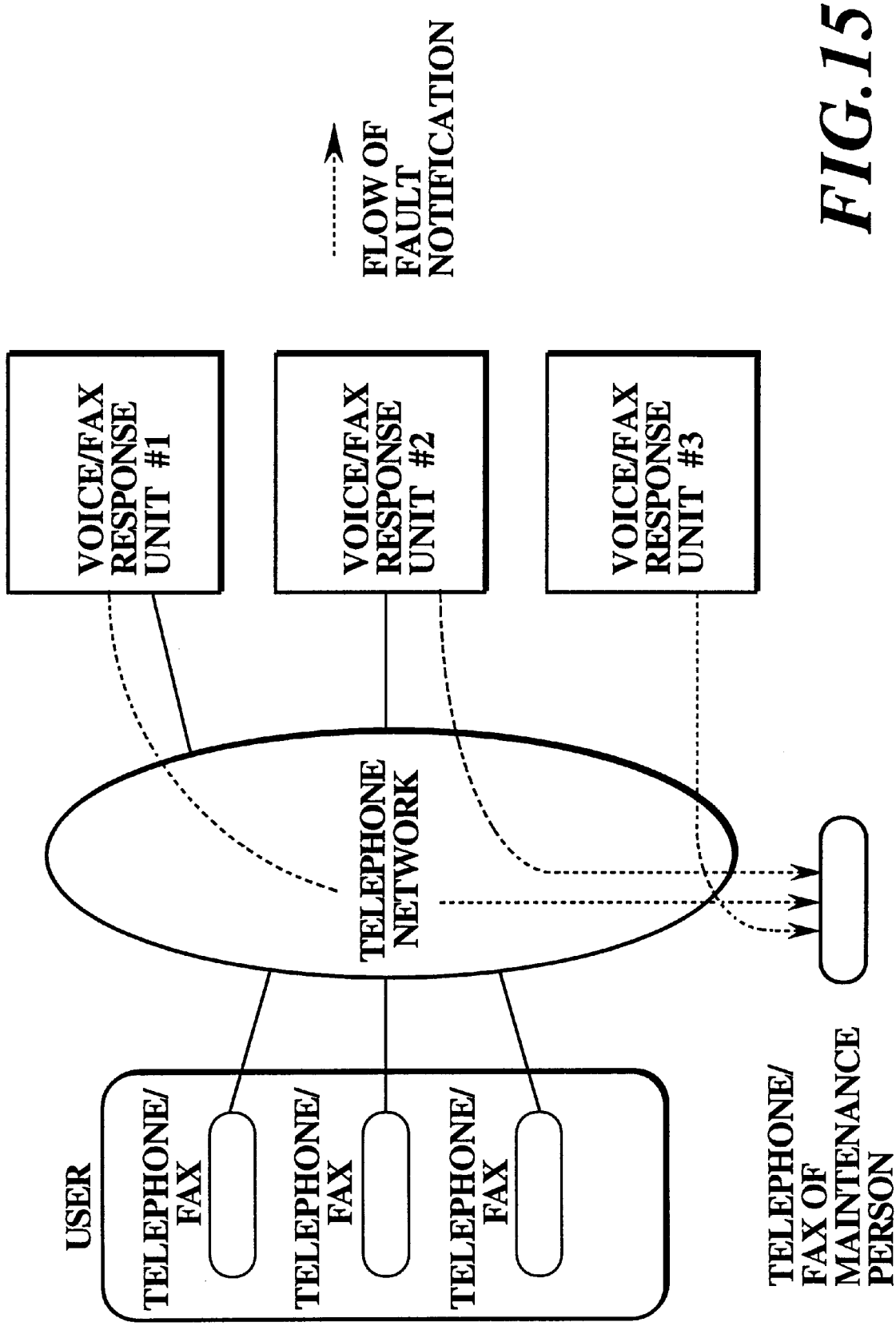
FIG. 15 is a schematic block diagram, similar to FIG. 9, illustrating an operational configuration of a voice/facsimile response unit in the alternative embodiment.

Referring to FIG. 15, illustrating an application scheme of the voice/fax response units, if any of the voice/facsimile response units detects a fault of itself, it can notify the telephone or facsimile subscriber unit of a maintenance person as indicated by the broken lines. The monitoring can be achieved simultaneously with the services for users.

According to the fault monitoring system of the present alternative embodiment, it is possible to obviate the dedicated monitor computer or telecommunications channels, because each of the operating voice/facsimile response units detects a fault by itself and notifies it to a maintenance person.

In addition, since the information is automatically sent without delay to the telephone or telefax of a maintenance person when the voice/facsimile response unit detects a fault of itself, it is not necessary for the maintenance person to continually monitor the voice/facsimile response units.

The entire disclosure of Japanese patent application No. 222029/1996 filed on August 23, 1996 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A system for monitoring a plurality of information guide units interconnected to a telephone switching system by a telephone line for sending guidance information to the telephone switching system on the telephone line, each of said plurality of information guide units comprising:

a monitoring circuit for monitoring at least one other of said plurality of information guide units to detect a fault in said at least one other of said plurality of information guide units;

a storage device for storing data defining a prescribed receiver unit which is interconnected to the telephone switching system and is to be notified of the fault detected; and a notifying circuit, operative in response to said monitoring circuit detecting the fault, for referencing the data stored in said storage device and notifying the prescribed receiver unit of fault information on the fault over the telephone line.

2. The system in accordance with claim 1, wherein each of said plurality of information guide units monitors others of said plurality of information guide units.

3. The system in accordance with claim 1, wherein the telephone line over which the fault information is notified is a telephone line over which a subscriber to the telephone switching system inquires about the guidance information of said plurality of information guide units.

4. The system in accordance with claim 2, wherein said monitoring circuit comprises a sender for calling said at least one other of said plurality of information guide units through the telephone switching system for monitoring said at least one other of said plurality information guide units.

5. The system in accordance with claim 1, wherein said notifying circuit transfers the fault information in a form of a voice message.

6. The system in accordance with claim 1, wherein said notifying circuit transfers the fault information in a form of a facsimile message.

7. The system in accordance with claim 1, wherein the data stored in said storage device further defines a form in which the fault information is to be transmitted to the prescribed receiver unit; and wherein said notifying circuit transmits the fault information to the prescribed receiver unit in the form defined by the data stored in said storage device.

8. The system in accordance with claim 4, further comprising a controller for causing said sender to periodically call said at least one other of said plurality of information guide units; and wherein said monitoring circuit determines that the fault has occurred in said at least one other of said plurality of information guide units when said monitoring circuit fails to receive the guidance information a predetermined number of times from said at least one other of said plurality of information guide units.

9. The system in accordance with claim 1, wherein said monitoring circuit is adapted for monitoring said information guide unit per se to detect a fault in said information guide unit per se.

10. A method of monitoring a plurality of information guide units interconnected to a telephone switching system by a telephone line for sending guidance information to the telephone switching system on the telephone line, said method comprising:

monitoring at least one other of the plurality of information guide units;

detecting a fault in the at least one other of the plurality of information guide units;

preparing data defining a prescribed receiver unit which is interconnected to the telephone switching and is to be notified of the fault detected;

referencing the data prepared; and notifying the prescribed receiver unit defined by the data referenced of fault information on the fault detected over the telephone line.

11. The method in accordance with claim 10, said method further comprising:

monitoring each of the plurality of information guide units per se; and detecting a fault in each of the plurality of the information guide units per se.

12. A telephone switching system comprising:

a telephone switching network accommodating a plurality of telephone lines; and a plurality of information guide units interconnected to said telephone switching network by one of the plurality of telephone lines for sending guidance information to said telephone switching network on the one of the plurality of telephone lines;

each of said information guide units comprising:

a monitoring circuit for monitoring at least one other of said plurality of information guide units to detect a fault in said at least one other of said plurality of information guide units;

a storage device for storing data defining a prescribed receiver unit which is interconnected to the telephone switching system and is to be notified of the fault detected; and a notifying circuit, operative in response to said monitoring circuit detecting the fault, for referencing the data stored in said storage device and notifying the prescribed receiver unit of fault information on the fault over the one of the plurality of telephone lines.

13. The telephone switching system in accordance with claim 12, wherein said monitoring circuit is adapted for monitoring said information guide unit per se to detect a fault in said information guide unit per se.

* * * * *